(12) United States Patent
Diantonio

(10) Patent No.: US 7,631,879 B2
(45) Date of Patent: Dec. 15, 2009

(54) "L" BUTT GAP SEAL BETWEEN SEGMENTS IN SEAL ASSEMBLIES

(75) Inventor: Gregory L. Diantonio, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 15 days.

(21) Appl. No.: 11/472,047

(22) Filed: Jun. 21, 2006

(65) Prior Publication Data

US 2007/0296160 A1    Dec. 27, 2007

(51) Int. Cl.
*F16J 15/447* (2006.01)
*F16J 15/00* (2006.01)

(52) U.S. Cl. .................. 277/416; 277/543; 277/546; 277/632

(58) Field of Classification Search ......... 277/411–414, 277/416, 493, 543, 546, 632
See application file for complete search history.

(56) References Cited

U.S. PATENT DOCUMENTS

| 3,235,275 | A | * | 2/1966 | Hart | 277/546 |
| 3,552,753 | A | * | 1/1971 | Mierley | 277/632 |
| 3,966,356 | A | * | 6/1976 | Irwin | 415/173.3 |
| 4,599,841 | A | * | 7/1986 | Haid | 52/396.04 |
| 4,979,755 | A | * | 12/1990 | Lebreton | 277/303 |
| 6,431,550 | B1 | * | 8/2002 | Tong | 277/346 |
| 6,682,300 | B2 | * | 1/2004 | Bolms | 415/173.3 |
| 6,874,787 | B2 | * | 4/2005 | Kono | 277/355 |

* cited by examiner

*Primary Examiner*—Vishal Patel
(74) *Attorney, Agent, or Firm*—Cantor Colburn LLP

(57) ABSTRACT

Disclosed herein is a seal assembly for a rotary machine having a plurality of arcuate segments and at least one seal. The plurality of arcuate segments are arrayed in an annulus and have butt joints, each of the arcuate segments has a radially outermost surface and a downstream face. The at least one seal is arranged to minimize leakage through the butt joints. The at least one seal has a first portion configured to minimize leakage at the radially outermost surface and a second portion configured to minimize leakage at the downstream face.

7 Claims, 6 Drawing Sheets

ID# "L" BUTT GAP SEAL BETWEEN SEGMENTS IN SEAL ASSEMBLIES

BACKGROUND OF THE INVENTION

This application relates generally to rotary machines, and more specifically to seal assemblies between components of a rotary machine. In rotary machines, such as steam turbines for example, it is customary to employ a seal assembly having a plurality of arcuate segments to form a seal between two stationary components and between a stationary component and a rotating component. Generally, the arcuate segments are disposed in an annular groove of one of the components. Each arcuate segment further has a sealing face in opposition to the other component. The sealing function is achieved by creating relatively tight clearances between the sealing face of the arcuate segments and the opposing component.

During the operation of the rotary machine, and more particularly during startup, shutdown or transient operations, components experience different thermal expansion rates, which in turn governs the spacing between the arcuate segments as the components expand and contract. The ability to minimize leakage between the arcuate segments allows for the formation of an effective seal between the components. Minimizing leakage between the arcuate segments also significantly improves rotary machine performance and efficiency.

Accordingly, there is a need to provide a seal assembly having enhanced sealing capabilities throughout all phases of the rotary machine operation.

BRIEF SUMMARY OF THE INVENTION

Disclosed herein is a seal assembly for a rotary machine having a plurality of arcuate segments and at least one seal. The plurality of arcuate segments are arrayed in an annulus and have butt joints, each of the arcuate segments has a radially outermost surface and a downstream face. The at least one seal is arranged to minimize leakage through the butt joints. The at least one seal has a first portion configured to minimize leakage at the radially outermost surface and a second portion configured to minimize leakage at the downstream face.

Further disclosed herein is a rotary machine having a first component, a seal assembly, a second component, and at least one seal. The first component has an annular groove. The seal assembly has a plurality of arcuate segments and is disposed within the annular groove. The second component is disposed adjacent to the arcuate seal segments. The at least one seal is disposed between the segments such that a first portion of the at least one seal has a surface complementary to a radially outermost surface of the segments.

BRIEF DESCRIPTION OF THE DRAWINGS

Referring to the drawings wherein like elements are numbered alike in the several Figures.

DETAILED DESCRIPTION OF THE INVENTION

Figure 1:
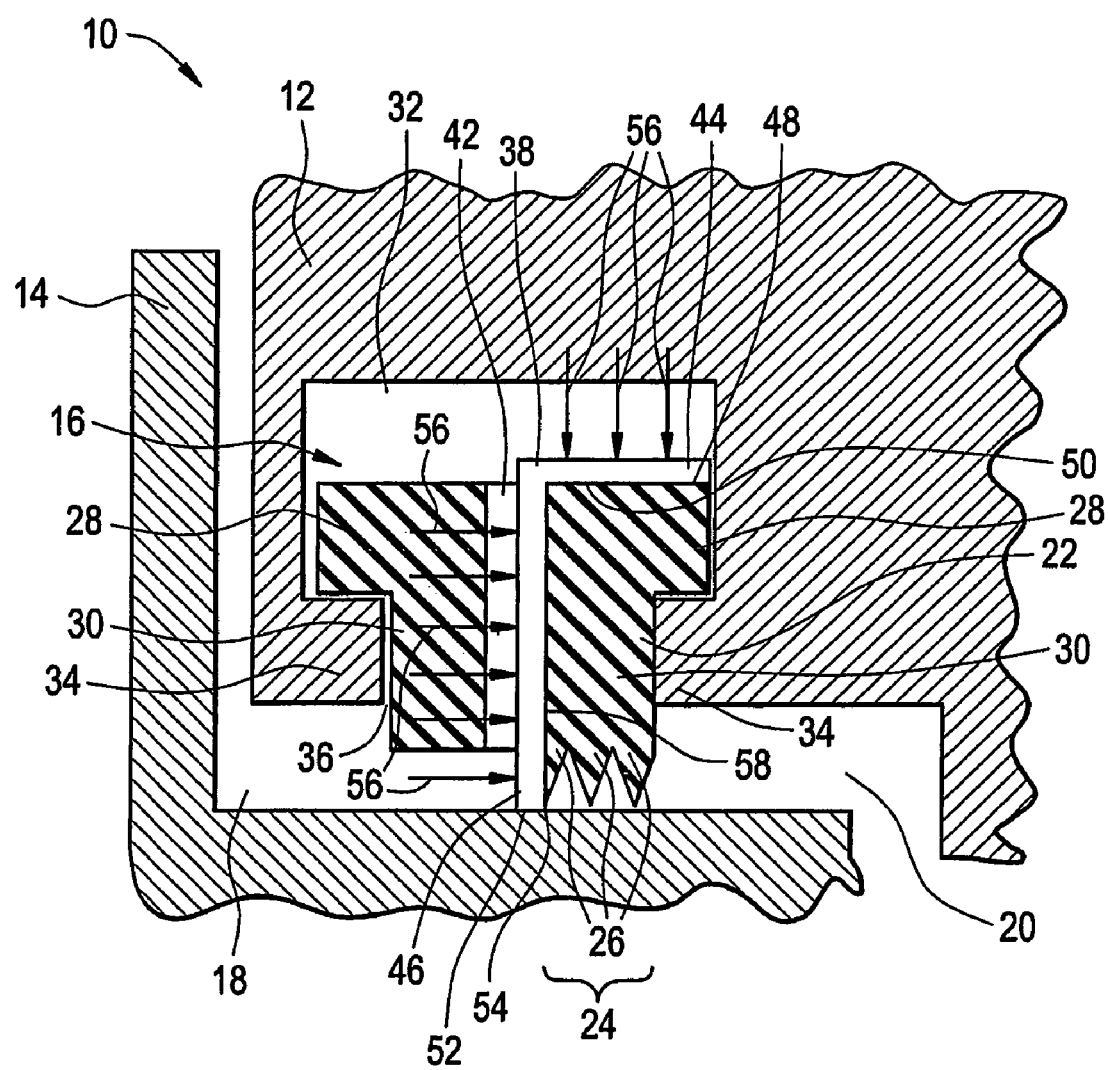
FIG. 1 is a cross section view of a portion of a rotary machine.
Figure 2:
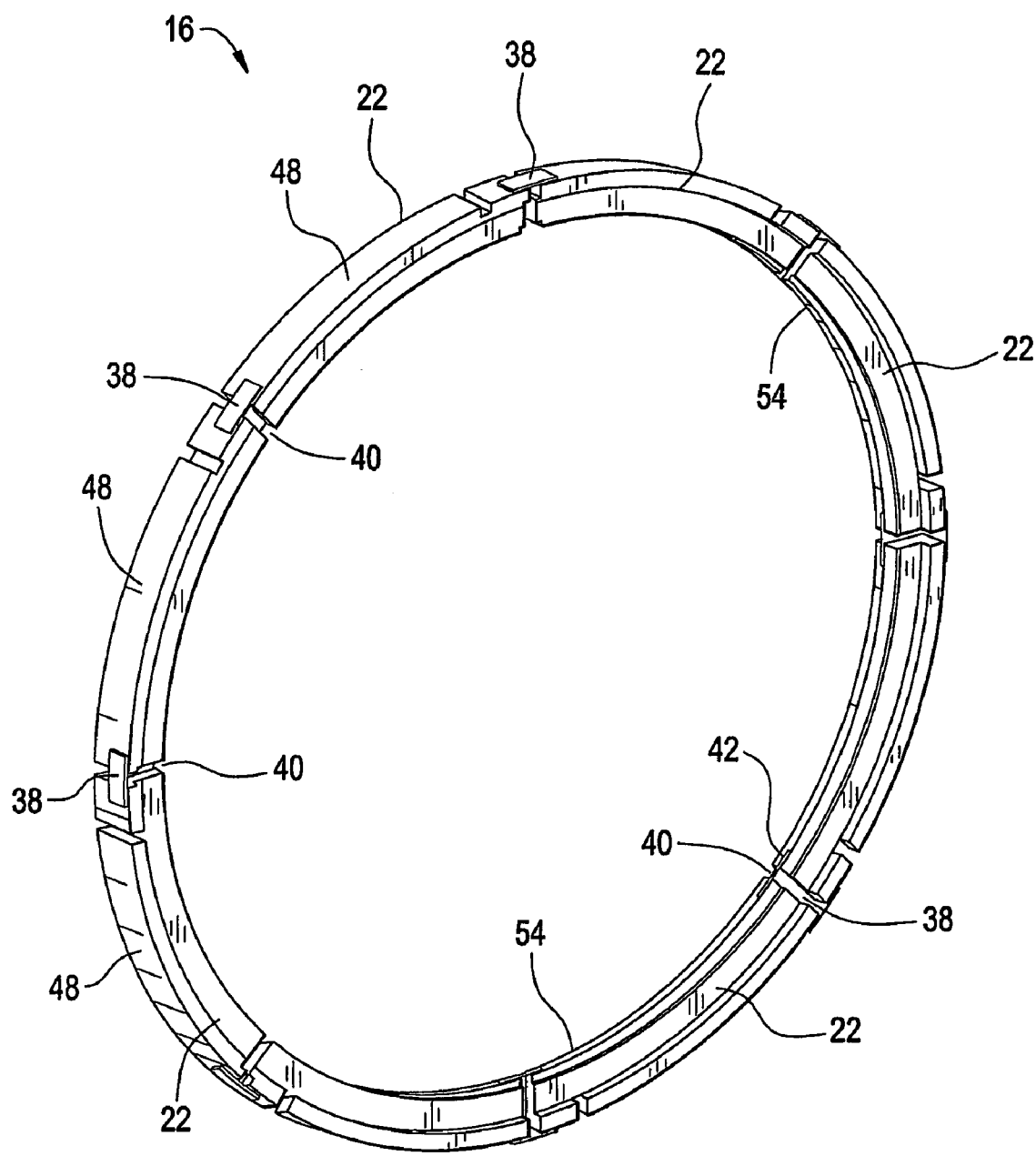
FIG. 2 is a perspective view of an exemplary seal assembly.

Referring to FIG. 1, there is illustrated a cross section view of a portion of a rotary machine, for example, a steam turbine, generally designated 10, having a first stationary component 12 and a second stationary component 14. To minimize leakage between the first stationary component 12 and the second stationary component 14, a seal assembly 16 is provided at a component-to-component (e.g., the first stationary component 12 and the second stationary component 14) interface separating high and low pressure regions 18 and 20 respectively. The seal assembly 16 is formed of an annular array of arcuate segments 22 (further illustrated in FIG. 2). Each seal segment 22 also has a sealing face 24 with projecting radial teeth 26 acting as partial barriers to a fluid medium, such as steam for example, flowing from the high to low pressure regions 18 and 20. It will be appreciated that although FIG. 2 shows eight arcuate segments 22, the number of arcuate segments 22 within the seal assembly 16 may be varied, to a greater or fewer number, according to operational considerations.

The radial outer portions of the segments 22 include segment locating flanges 28 which extend from the segment 22 in axially opposite directions away from one another. An axially reduced neck 30 extends between the segment sealing face 24 and the segment locating flanges 28. The segments 22 are disposed in an annular groove 32, having a "T" shaped cross section, within the first stationary component 12. The annular groove 32 is defined along the radially innermost portions of the stationary component 12 by a pair of stationary component locating flanges 34 which extend axially toward one another defining a slot 36 therebetween. The segments 22 are positioned such that the axially reduced neck 30 of the segments 22 is fitted within the stationary component slot 36.

The seal assembly 16 configuration pursuant to this disclosure is useful with a wide variety of parts and components disposed within a rotary machine 10. While the following discussion will be with reference to seal assemblies disposed between two stationary components, such as between two turbine shells for example, it should be understood that the disclosed seal assembly 16 may also be disposed between a stationary component and a rotating component, such as between a turbine diaphragm and a shaft for example.

Figure 3:
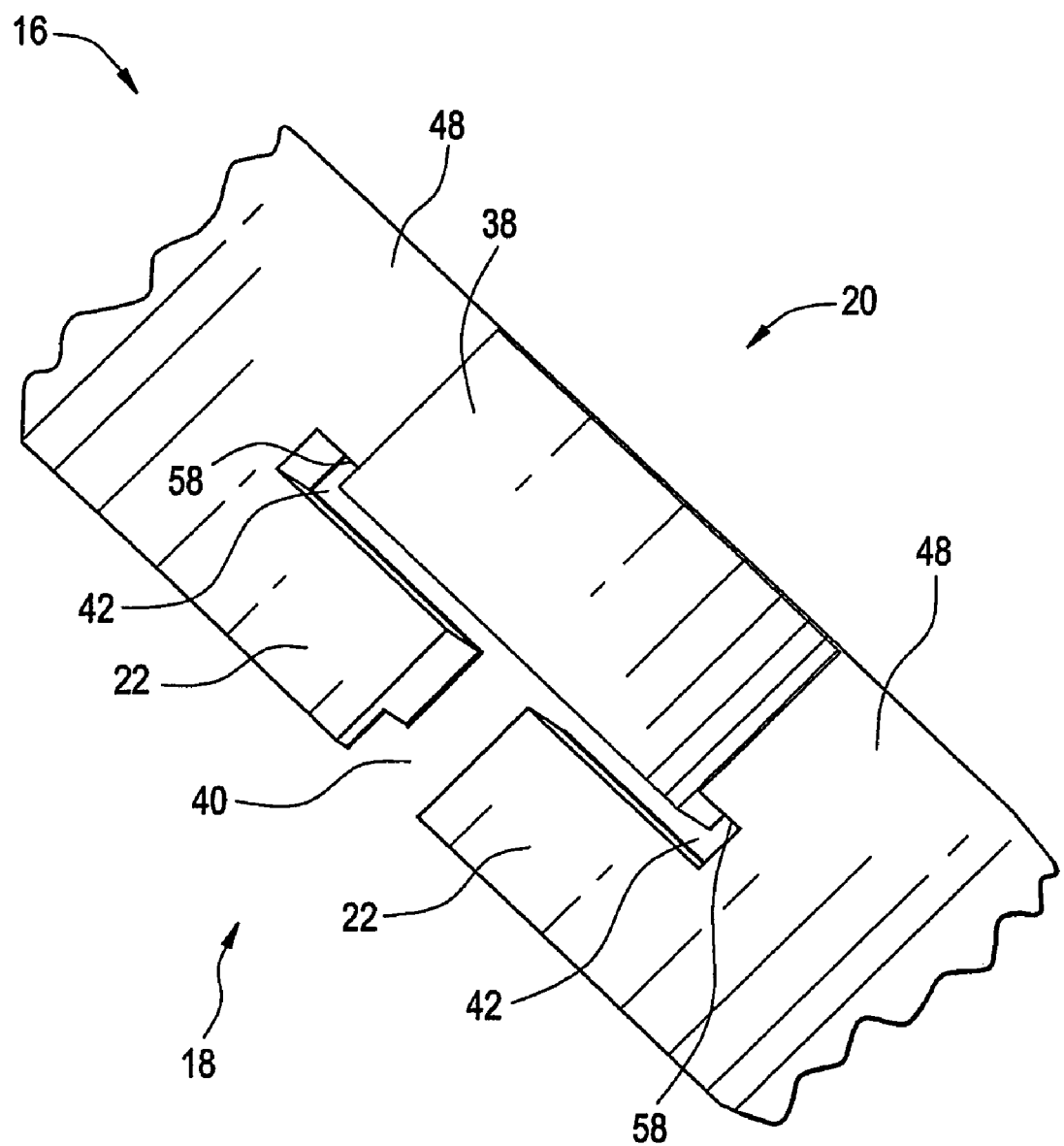
FIG. 3 is a partial plan view of the seal assembly of FIG. 2.
Figure 4:
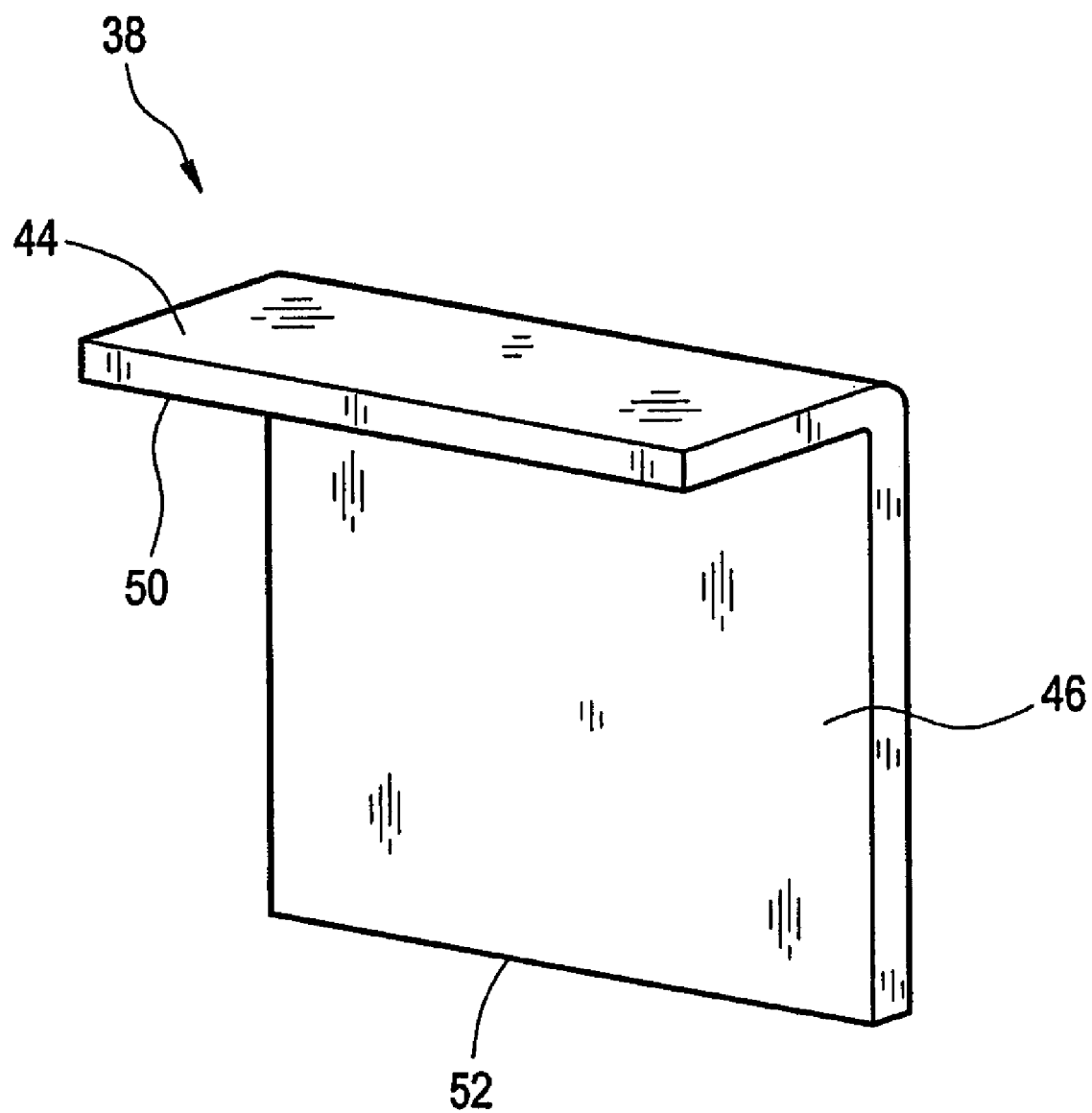
FIG. 4 is a perspective view of an exemplary seal.
Figure 5:
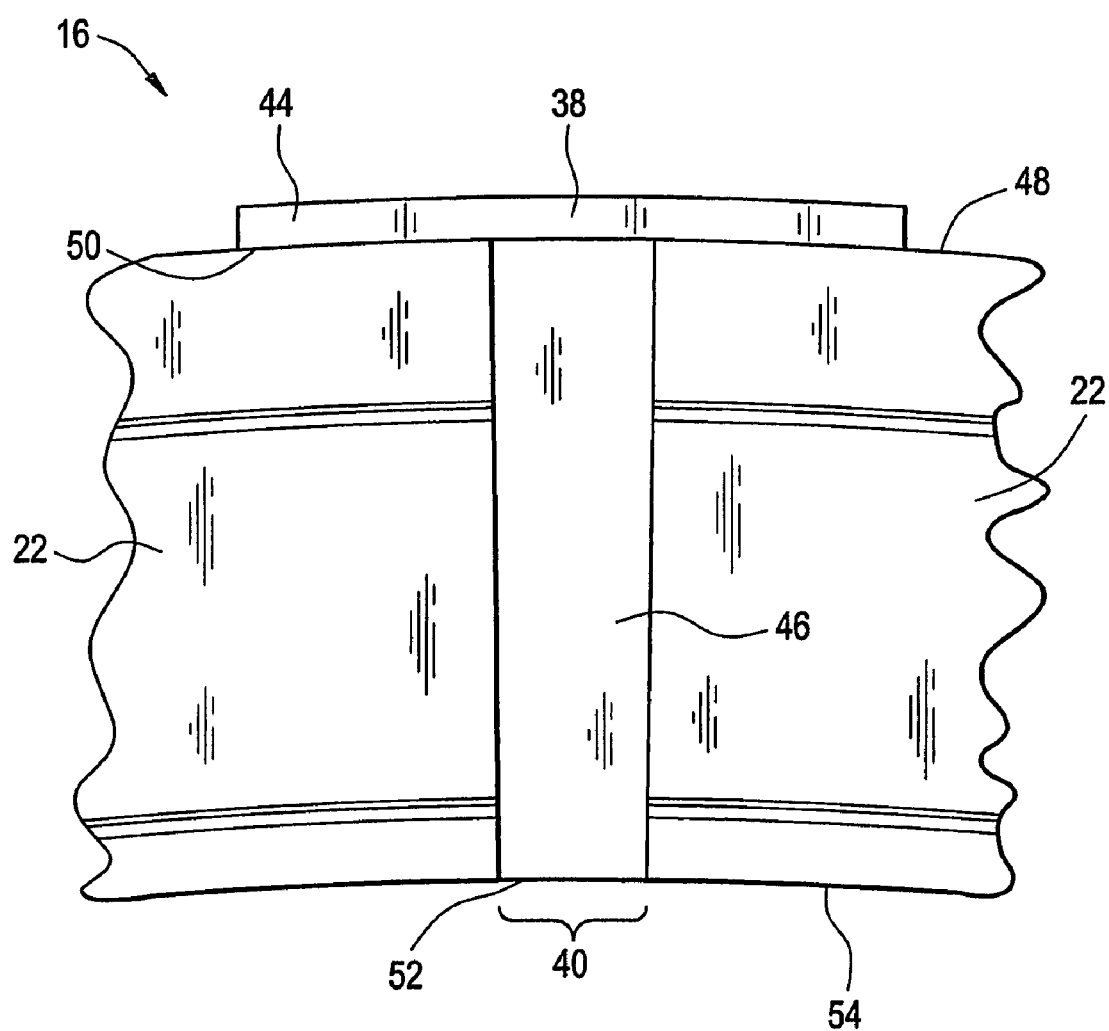
FIG. 5 is an enlarged front plan view of the seal assembly of FIG. 2.

A plurality of seals having an "L" shape (best illustrated in FIGS. 3 and 4), hereinafter referred to as "L" seals 38, are disposed at a plurality of butt gaps 40 (best shown in FIGS. 2-3 and 5-7) between the arcuate segment 22 ends. Each end of the segments 22 has a radial slot 42 configured to accept a half of the "L" seal. The "L" seals 38 have an axial portion 44, substantially parallel to a central axis of the seal assembly 16, and a radial portion 46, substantially perpendicular to the central axis of the seal assembly 16. When installed, the "L" seals 38 are disposed such that the axial portion 44 is adjacent to a radially outermost surface 48 of the segments 22 and the radial portion 46 is disposed within the slot formed between two adjacent ends of the segments 22. Although the figures show the axial portion 44 shorter than the radial portion 46, it is to be understood that these lengths can vary depending on segment 22 geometry and application specific considerations. Additionally, although the figures and following discussion describe the "L" seals 38 as having an "L" shape with one portion substantially parallel to the central axis of the seal assembly and another portion substantially perpendicular to the central axis of the seal assembly, it is should be appreciated that other shapes, with portions complimentary to the profile of the surrounding segment, are envisioned. Further it is to be understood that although the "L" seals 38 are illustrated and described as being freely disposed within the radial slot 42 between the segments 22, it is to be understood that each of the "L" seals 38 may alternatively be attached to an adjacent segment at one end of the "L" seal and free to move within the radial slot of the other adjacent segment at the other end of the "L" seal.

The "L" seals 38 may further comprise features to enhance the sealing capability at the butt gap regions. For example, in one embodiment, the segment tooth adjacent to the "L" seal may be configured to have one side parallel to the radial portion 46 of the "L" seal 38. As can be seen in FIG. 1, the segment teeth 26 not adjacent to the "L" seal 38 have sides that are not parallel to the segment seal. Having a segment tooth with one side parallel to the "L" seal promotes sealing along the entire radial length of the interface between the radial portion 46 of the "L" seal 38 and the segment 22. In particular, having a segment tooth with one side parallel to the "L" seal 38 helps reduce leakage around the seal at the "L" seal-to-tooth interface (best illustrated in FIG. 1) by minimizing the gap between the "L" seal 38 and the segment teeth 26. Further, it will be appreciated that although FIG. 1 shows the segments 22 having three teeth 26, any number of teeth 26 are envisioned.

For example, in another embodiment, the axial portion 44 of the "L" seal may be configured to have a complementary surface 50 to that of the radially outermost surface 48 of the segments 22. The desired shape of the complementary surface 50 may be achieved by manufacturing methods such as machining, forming or casting operations for example. The complementary surface 50 creates mating surfaces between the "L" seal 38 and the segments 22 which provides for additional sealing capability in the region of the butt gaps 40 (best illustrated in FIG. 5) by minimizing the gap between the outermost surface 48 of the segments 22 and the complementary surface 50 of the "L" seal 38. Additionally, the "L" seal 38 may be fabricated from the same material as that of the adjacent segments 22. Having a common material between the segments 22 and the "L" seals 38 allows for maximizing the sealing capability in the region of the butt gaps by minimizing differential thermal expansion between the mating parts. Having common materials, or materials with similar thermal expansion rates, allows for the "L" seals 38 to thermally expand at the same rate the segments 22 expand thus promoting proper alignment of the "L" seals 38. The material common to the segments 22 and the "L" seals 38 may be metal alloys such as carbon steel, low carbon steel, 1¼ Cr-½ Mo alloy steel, and 2¼ Cr-1 Mo alloy steel for example.

And for example, in yet another embodiment, the innermost radial surface 52 of the radial portion 46 may have a contoured edge matching the innermost radius 54 of the segments 22. This configuration of the innermost radial surface 52 provides for proper alignment of the "L" seal 38 and limits leakage at the seal assembly to the second stationary component interface (best illustrated in FIG. 5). In particular, the innermost radial surface 52 minimizes leakage at the seal assembly 16 to the second stationary component 14 interface in the butt gap region, as there is a gap between the teeth 26 of the adjacent segments 22.

Additionally, the sizing of the individual "L" seals 38 may be modular, while allowing for dimensions such as the complementary surface 50 diameter and overall width to be customized with specific unit configuration, to allow for proper orientation and effective sealing of the "L" seals 38.

Figure 6:
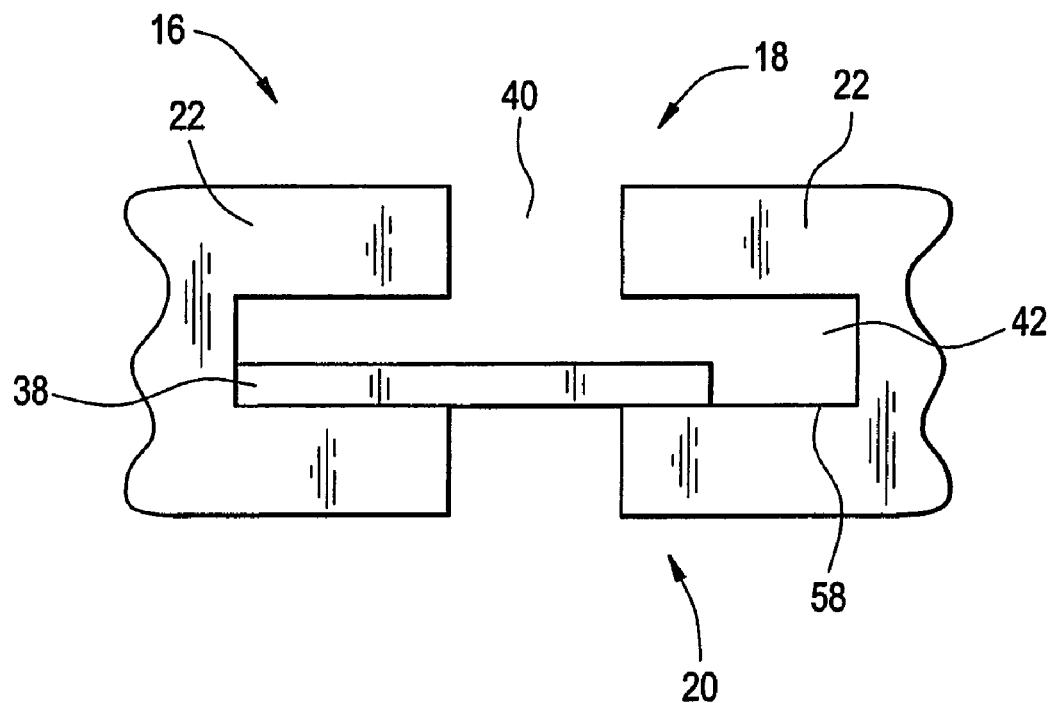
FIG. 6 is a section view of the seal assembly of FIG. 2 at a maximum butt gap width.
Figure 7:
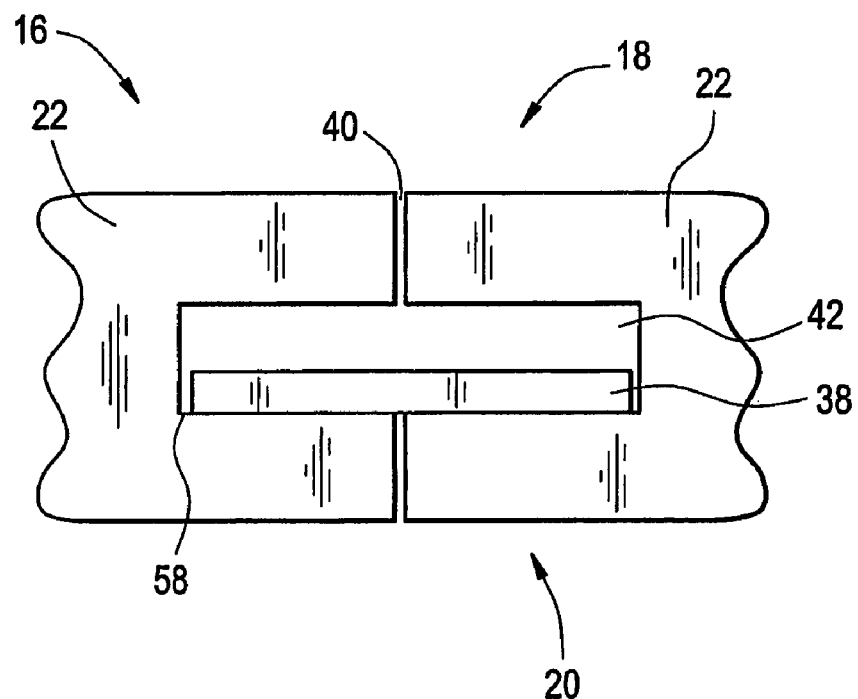
FIG. 7 is a section view of the seal assembly of FIG. 2 at a minimum butt gap width.

During operation of the rotary machine 10, a fluid medium, such as steam, from the higher pressure region builds a pressure upon the axial and radial portions of the "L" seal, as depicted by arrows 56 in FIG. 1. This pressure build up forces the "L" seal to contact the segments 22, wherein the axial portion 44 comes into contact with the radially outermost surface 48 of the segments 22 and the radial portion 46 comes into contact with a first downstream face 58 (within the radial slot 42) of the segments 22, and creates a seal at the butt gap region. At operational extremes, such as during startup/shutdown or transient operations for example, the butt gaps 40 between the segments 22 may vary, due to different thermal expansion rates between the components, between a maximum butt gap width, as illustrated in FIG. 6, to a minimum butt gap width, wherein the segments 22 are in close proximity to or in contact with each other, as illustrated in FIG. 7. The "L" seals 38 and the radial slots 42 have dimensions capable of maintaining proper alignment of the "L" seals 38 throughout the full operating range of the rotary machine 10.

Significant advantages in rotary machine 10 performance may be attained by the disclosed seal assembly 16 configuration. The "L" seal configuration provides improved leakage performance thus resulting in increased overall efficiency of the rotary machine 10.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A seal assembly for a rotary machine comprising:
   a plurality of arcuate segments arrayed in an annulus and having substantially axially extending butt joints therebetween, each of the arcuate segments having a radially outermost surface and a downstream face;
   at least one substantially L-shaped seal arranged to reduce leakage through the butt joints, the at least one seal having a first portion disposed radially outboard of the radially outermost surface and configured to reduce leakage at the radially outermost surface and a second portion configured to reduce leakage in an axial direction through the butt joints at the downstream face;
   the first portion is substantially parallel to an axis of the seal assembly;
   the second portion is substantially perpendicular to the axis of the seal assembly;
   each end of the arcuate segments has a radial slot; and
   the second portion of the at least one substantially L-shape seal is disposed within the radial slots of the arcuate segments.

2. The seal assembly of claim 1 wherein each of the arcuate segments further comprises one or more radial teeth.

3. The seal assembly of claim 2 wherein one of the one or more radial teeth has a side substantially parallel to the first portion of the at least one seal.

4. The seal assembly of claim 1 wherein the first portion of the at least one seal has a surface complementary to the radially outermost surface of the arcuate segments.

5. The seal assembly of claim 1 wherein an innermost radial surface of the second portion of the at least one seal has a contoured edge matching the innermost radius of the arcuate segments.

6. The seal assembly of claim 1 wherein the first portion is substantially parallel to a central axis of the seal assembly and the second portion is substantially perpendicular to a central axis of the seal assembly.

7. The seal assembly of claim 1 wherein the first portion is substantially perpendicular to the second portion.

* * * * *